United States Patent [19]

Larson et al.

[11] Patent Number: 5,679,754
[45] Date of Patent: Oct. 21, 1997

[54] LOW-SURFACE ENERGY SULFO-POLYURETHANE OR SULFO-POLYUREA COMPOSITIONS

[75] Inventors: Wayne K. Larson, Maplewood, Minn.; Richard E. Bennett, Hudson, Wis.; Nicole L. Franchina, Afton, Minn.

[73] Assignee: Minnesota Mining and Manufacturing Company, St. Paul, Minn.

[21] Appl. No.: 653,141

[22] Filed: Jun. 6, 1996

Related U.S. Application Data

[63] Continuation of Ser. No. 356,867, Dec. 15, 1994, abandoned.

[51] Int. Cl.[6] .................................................. C08G 18/61
[52] U.S. Cl. ........................ 528/28; 528/61; 528/65; 528/70; 528/71; 524/588; 524/589; 524/591
[58] Field of Search ................................ 528/28, 61, 65, 528/70, 71; 524/588, 589, 591

[56] References Cited

U.S. PATENT DOCUMENTS

| | | | |
|---|---|---|---|
| 3,325,306 | 6/1967 | Caldwell | 117/138.8 |
| 3,328,482 | 6/1967 | Northrup et al. | 260/825 |
| 3,527,659 | 9/1970 | Keil et al. | 117/145 |
| 3,770,687 | 11/1973 | Mestetsky | 260/30.4 |
| 4,171,397 | 10/1979 | Morrow | 428/195 |
| 4,279,717 | 7/1981 | Eckberg et al. | 204/159.13 |
| 4,307,219 | 12/1981 | Larson | 528/71 |
| 4,313,988 | 2/1982 | Koshar et al. | 428/40 |
| 4,558,149 | 12/1985 | Larson | 560/14 |
| 4,746,717 | 5/1988 | Larson | 528/68 |
| 4,855,384 | 8/1989 | Larson | 528/60 |
| 5,217,805 | 6/1993 | Kessel et al. | 428/352 |
| 5,244,739 | 9/1993 | Carlson et al. | 428/425.9 |
| 5,356,706 | 10/1994 | Shores | 428/352 |

FOREIGN PATENT DOCUMENTS

| | | |
|---|---|---|
| 0 127 061 | 4/1986 | European Pat. Off. . |
| 0 339 862 | 11/1989 | European Pat. Off. . |
| 0 606 532 | 7/1994 | European Pat. Off. . |
| 0 606 532 A1 | 7/1994 | European Pat. Off. . |
| 37 30 780 | 3/1989 | Germany . |
| 476 063 | 9/1969 | Switzerland . |
| 1161538 | 8/1969 | United Kingdom . |

*Primary Examiner*—Rachel Gorr
*Attorney, Agent, or Firm*—Gary L. Griswold; Walter N. Kirn; Lorraine R. Sherman

[57] ABSTRACT

A water dispersible polymeric composition comprises at least one sulfo group containing segment, which group comprises at least one urethane or urea connecting group, said composition also comprising at least one hydrophobic segment, which segment comprises at least one urethane or urea connecting group. The composition when dried can provide a coating on a substrate or an article having low surface energy and preferably ink receptive properties. The article can provide release capabilities towards adhesives, particularly pressure sensitive adhesives.

23 Claims, No Drawings

LOW-SURFACE ENERGY SULFO-POLYURETHANE OR SULFO-POLYUREA COMPOSITIONS

This is a continuation of application Ser. No. 08/356,867 filed Dec. 15, 1994, now abandoned.

FIELD OF THE INVENTION

The present invention relates to water dispersible sulfo-polyurethane or sulfo-polyurea compositions having at least one hydrophobic-containing segment and at least one sulfo-organic segment. Compositions of the invention have utility as ink receptive low surface energy coatings which display release properties toward adhesives.

BACKGROUND OF THE INVENTION

Materials having release properties toward pressure-sensitive adhesives have been used for many years as release coatings for adhesive roll and sheet materials. For this purpose, many anti-stick or "abhesive" materials have been used including wax-coated paper, starch-impregnated fabrics, plastic films, plastic-coated paper, and a variety of silicone polymers.

Hydrophobic polymers or polymer compositions, including polysiloxanes, higher alkyl (ie. $C_{12}$–$C_{30}$) aliphatic polymers, and fluorochemical polymers, can provide coatings having release values from about 0.4 N/dm width up to values of 70 N/dm or more. Polydimethylsiloxanes, polymers containing predominantly dimethylsiloxane units, can provide very low release coatings, e.g., 0.4 to 1.6 N/dm width, for adhesive compositions commonly used for labels or large adhesive sheet constructions. These polymers are less useful as release coatings on the back surface of adhesive tape (back surface coating of adhesive tape is known as "low adhesion backsize (LAB)) because their low release force can cause roll instability. LABs for tapes in roll form ideally exhibit release values of about 6.0 to 35 N/dm width. Release values typically greater than 20 N/dm width have been realized with non-silicone polymers, e.g., polyurethanes and more recently by modifications of polydimethylsiloxanes or a blend of the polydimethylsiloxanes with less effective release materials, as disclosed in, for example, U.S. Pat. Nos. 3,328,482, 3,527,659, 3,770,687, 4,171,397, and 4,313,988. Constructions utilizing these materials as release coatings are typically prepared by solution coating operations which use costly solvent recovery apparatus to control solvent emissions.

Silicone compositions useful for release coatings that do not require the use of solvent coating operations are also known. These compositions are necessarily fluid and contain functional groups and/or crosslinking agents which, following the coating of the composition onto a substrate and subsequent thermal cure or actinic radiation cure, form substantive abhesive coating. Examples of such fluid silicone compositions are disclosed in, for example, U.S. Pat. Nos. 4,279,717 and 5,217,805.

Aqueous solvent dispersible linear sulfopolyurethane resins prepared from hydrophilic and hydrophobic diols have been disclosed in U.S. Pat. No. 4,307,219. Hydrophilic sulfopolyurethanes and sulfopolyureas are disclosed in U.S. Pat. Nos. 4,558,149, 4,746,717, and 4,855,384.

SUMMARY OF THE INVENTION

Briefly, the present invention provides a water-dispersible polymeric composition which comprises at least one sulfonate group containing segment, which segment comprises at least one urethane or urea group, said composition providing at least one hydrophobic segment, which segment comprises at least one urethane or urea group, and the composition when dried provides coatings or articles having low surface energy (i.e., release) and preferably ink receptive properties. The compositions of the invention preferably have a sulfonate equivalent weight of about 2,000 to about 8,000 g/mole and a hydrophobic content of from 3 to 80% by weight, the hydrophobic segment having a number average molecular weight of from about 200 to about 20,000.

The invention also provides for substrates bearing low surface energy, preferably ink-receptive coatings of the invention having specific release characteristics toward adhesive materials, particularly pressure-sensitive adhesives. Low surface energy, ink-receptive coatings of the polyurethane/polyurea compositions of the invention preferably contain at least 15 percent by weight hydrophobic segments.

In a further aspect, the invention comprises aqueous dispersions comprising up to 40 percent by weight of the polyurethane/polyurea compositions and 60 weight percent solvents such as water or aprotic solvents (e.g., methylethyl ketone, acetone) and optional adjuvants in amounts suitable for their intended use.

In a still further aspect of the invention, a process for the preparation of the polyurethane/polyurea compositions of the invention is provided.

In yet another aspect of the invention, self-supporting films, fibers, and molded articles of the polyurethane/polyurea compositions are provided.

In this application:

"thermoplastic" means a polymeric material which is melt processable at elevated temperatures;

"sulfo group" means a sulfonate group (—$SO_3M$ group where M can be H or a cation);

"sulfo compound" means a compound containing a pendant sulfonate (sulfo) group;

"urethane/urea group" means a urethane or urea group;

"polyurethane/polyurea" means an oligomer or polymer comprising urethane or urea groups or a combination thereof;

"sulfo organic segment" means an organic group comprising at least one pendant sulfonate (sulfo) group, at least one ester group, and at least one of urethane and urea groups;

"hydrophobic segment" means an organic group comprising at least one of a polysiloxane segment, a higher alkyl segment, and a fluorochemical segment;

"polysiloxane segment" means an organic group comprising at least one polysiloxane segment and at least one urethane/urea group;

"higher alkyl segment" means an organic group comprising at least one segment containing $C_{12}$–$C_{30}$ alkyl pendent groups and at least one urethane/urea group;

"fluorochemical segment" means an organic group comprising at least one segment containing a pendant fluoroaliphatic group having at least four fully fluorinated carbon atoms and at least one urethane/urea group;

"sulfopolyurethane/sulfopolyurea (SPUR) composition" means a composition comprising one or more polymers containing both sulfo group containing segments and hydrophobic segments and optionally one or more polymers containing only sulfo-organic segments;

"molecular weight" means the sum of the atomic weights of all atoms in a group of atoms or in a segment of a polymer and under the circumstances where the group or segment may be a mixture of two or more groups or segments is the weight average of molecular weights of the groups or segments;

"lower alkyl group" means an alkyl group having 1 to 4 carbon atoms;

"higher alkyl group" means an alkyl group having 5–30 carbons;

"catenary" means in the main chain or backbone such as the oxygen in an ether but not the oxygen in a carbonyl group.

DETAILED DESCRIPTION OF PREFERRED EMBODIMENTS OF THE INVENTION

The present invention provides water-dispersible sulfopolyurethane/sulfopolyurea (SPUR) compositions comprising one or more randomly disposed water-dispersing sulfo organic segments and one or more hydrophobic segments. Each sulfo organic segment of the polymeric composition has a molecular weight of about 800 to 5,000 and can contain one or more sulfo groups. Each hydrophobic segment has a number average molecular weight of about 200 to 20,000, with the hydrophobic segment comprising from about 3 to 80 percent by weight of the polymeric composition. Coatings of the SPUR water-dispersible compositions of the present invention or articles formed from the compositions have low surface energy, ink-receptive surfaces that exhibit release characteristics toward adhesive materials, particularly pressure-sensitive adhesives.

The polyurethane polymeric compositions of the invention comprises polymers having a structural formula:

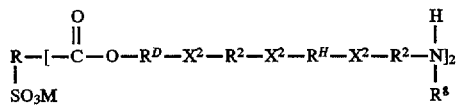

wherein

R is a $C_6$—$C_{12}$ aryltriyl group (trivalent aryl group) or a $C_6$–$C_{12}$ alkyltriyl (trivalent alkyl group) group in which M is a cation, preferably M is Na, but M can be H, an alkali metal such as K, Li, an alkaline earth metal cation (e.g., Mg, Ca, or Ba), or a primary, secondary, tertiary, or quaternary ammonium cation such as ammonium, methylammonium, butylammonium, diethylammonium, triethylammonium, tetraethylammonium, and benzyltrimethylammonium cation;

$R^D$ can be 1) at least one of a divalent straight chain or branched organic group of 20 to about 150 carbon atoms in units of 2 to 12 methylene groups and arylene groups of 6 to 10 carbon atoms separated by 1 to 50 catenary oxygen atoms or by 1 to 30 oxycarbonyl groups

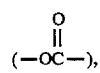

preferably 1 to 20 catenary oxygen atoms or by 1 to 10 oxycarbonyl groups, the organic group having a molecular weight of 400 to 2,500, preferably 600 to 1,000; or $R^D$ can be 2) an organic group selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group optionally being substituted by up to four lower alkyl groups having 1 to 4 carbon atoms and a total of up to 15 carbon atoms, which organic group can be chain extended by a transesterification reaction between a diol terminated ester precursor and a lower aliphatic diester of an aliphatic diacid having from 2 to 12 carbons or an aromatic diacid having from 8 to 12 carbons or reaction between a diol terminated ester precursor and an aliphatic lactone of 4 to 6 carbons; or $R^D$ can have the structure 3) [—$R^1$—($X^2$—$R^2$—$X^2$—$R^1$)$_n$—] where n is an integer from 1 to 5, produced by the reaction of a polyol with an isocyanate having the structure OCN—$R^2$—NCO to produce a segment having a molecular weight of from 500 to 4,000, preferably 800 to 2,000;

$R^1$ is straight or branched chain alkylene group having 2 to 12 carbon atoms or an arylene group having 6 to 10 carbon atoms;

$X^2$ is

$R^2$ is a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group optionally being substituted by up to four lower alkyl groups having 1 to 4 carbon atoms and a total of at most 15 carbon atoms;

$R^H$ is a divalent hydrophobic group selected from divalent oligomeric siloxanes having the structure

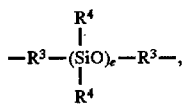

divalent organic groups having the structure

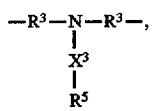

comprising a pendant alkyl group;

or divalent organic groups having one of the structures

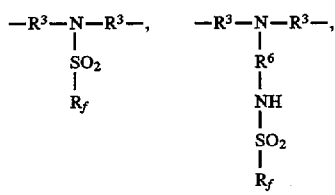

or quaternary salts thereof, wherein $R_f$ is a fluorocarbon pendant group;

wherein $R^3$ is a divalent organic group, preferably a straight chain or branched alkylene group having 2 to 12 carbon atoms, but it can also be an arylene, such as phenylene or an alkarylene group, each having 6 to 20 carbon atoms;

$R^4$ is a monovalent group selected from the group consisting of alkyl groups of one to about twelve carbon atoms, aryl having 6 to 10 carbon atoms, or aralkyl groups having 6 to 10 carbon atoms, with at least 70% of $R^4$ being methyl;

e is an integer of from about 10 to about 300;

$X^3$ is a covalent bond, a carbonyl

group, or an amide group

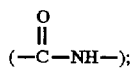

$R^5$ is a monovalent group selected from the group consisting of alkyl groups of about 4 to about 60 carbon atoms, preferably 12 to 30 carbon atoms;

$R^6$ is a divalent group selected from the group consisting of alkylene groups of 2 to about 12 carbon atoms;

$R_f$ is a monovalent saturated fluoroaliphatic group having 6 to 12 carbon atoms, at least four of which are fully-fluorinated carbon atoms;

$R^8$ is

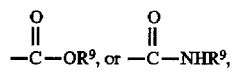

wherein $R^9$ is $-CH_2R^{10}$, $-C_2H_4R^{10}$, or $C_3H_6R^{10}$; and $R^{10}$ is $-H$, $-OH$, or $-NH_2$.

The SPUR compositions of the present invention preferably have a sulfonate equivalent weight of about 2,000 to 8,000 g per mole and a hydrophobic content of about 3 to 80% by weight, with the hydrophobic segment having a number average molecular weight of about 200 to 20,000. The SPUR compositions preferably have a weight average molecular weight in the range of 20,000 to 500,000, more preferably 30,000 to 100,000.

The process of the invention is schematically depicted in the Reaction Sequence below:

REACTION SEQUENCE

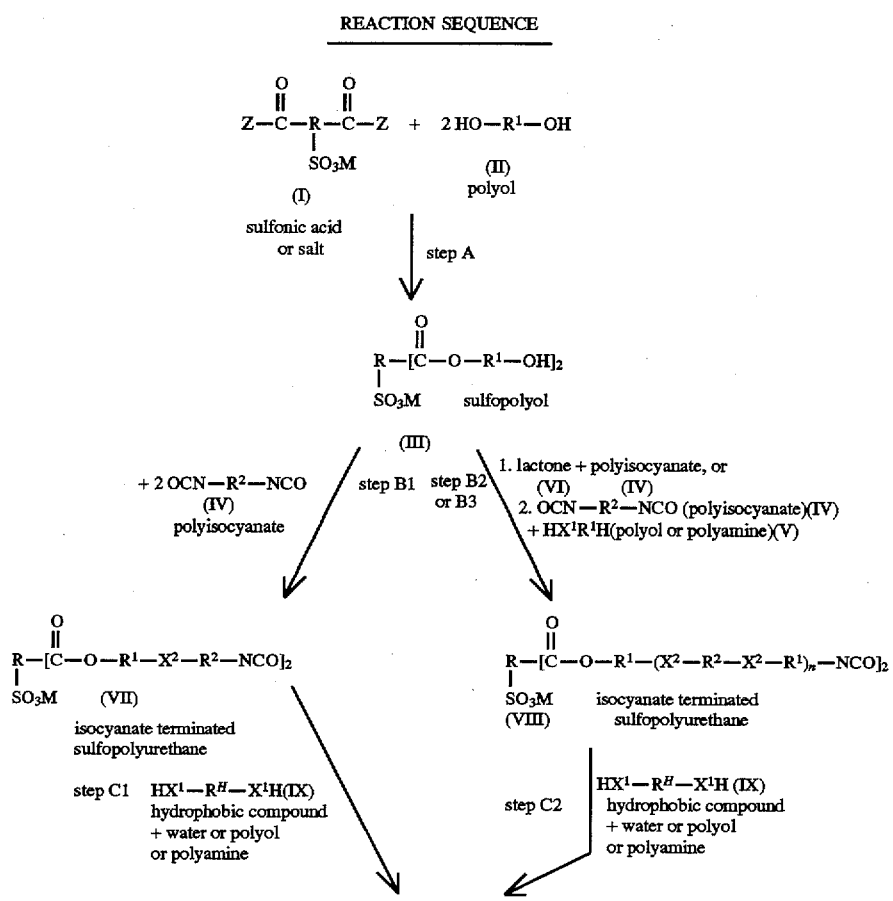

-continued
REACTION SEQUENCE

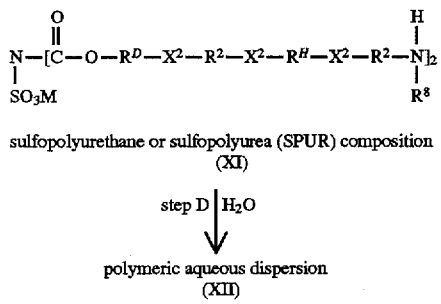

sulfopolyurethane or sulfopolyurea (SPUR) composition
(XI)

step D | H₂O polymeric aqueous dispersion
(XII)

wherein

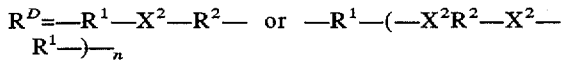

Z=OH or OR⁴, wherein R⁴=alkyl having 1 to 4 carbon atoms, and R, M, X², R¹, R², R⁸, R^H and n are as previously defined, and X¹ is N or O.

The SPUR composition of the invention is prepared by a process comprising the steps (see chart step A, B1, C1) of:

(a) (Step A) reacting a sulfonic acid or salt of formula (I) with a polyol to provide a sulfopolyol of formula (III);

(b) (Step B1) reacting the sulfopolyol with a polyisocyanate to provide an isocyanate-terminated sulfopolyurethane (formula VII);

(c) (Step C1) reacting the isocyanate-terminated sulfopolyurethane (VII) with an amino- or hydroxyorganic group-terminated hydrophobic monomer or oligomer of formula IX composition, in an inert organic solvent (ie. tetrahydrofuran, methyl ethyl ketone, dichloroethane, etc.) forming an isocyanate-terminated polyurethane or polyurea composition (SPUR) having sulfo-organic segments, and preferably 3 to 80 percent by weight of total polymer comprises hydrophobic segments, which is subsequently chain extended by reaction with water or an organic diamine or organic diol forming a sulfo-polyurethane/polyurea composition;

(d) (Step D) optionally, isolating the SPUR composition or inverting the organic solution of the SPUR composition to an aqueous dispersion of the composition with removal of the organic solvent.

The isocyanate-terminated sulfopolyurethane compounds disclosed in the above process (structures VII or VIII) are described in U.S. Pat. Nos. 4,558,149, 4,746,717, and 4,855,384, which are incorporated herein by reference. They are preferably prepared by the reaction of a sulfoarene or sulfoalkane dicarboxylic acid (or their esters), with two equivalents or more of polyols forming a mixture of sulfo-organic polyol and, in some cases, unreacted polyol. A range of 1.2 to 8 equivalents of polyol can be useful with three to five equivalents being preferred. The sulfo-organic polyol or its mixture with excess polyol is then reacted with excess organic diisocyanate (up to about 15 mole % excess).

Aliphatic or aromatic esterified sulfopolyols of formula (III) useful in preparing the isocyanate-terminated sulfopolyurethane compounds include ethylene glycol, propylene glycol, butylene glycol, hexamethylene glycol, cyclohexamethylenediol, branched chain diols such as neopentyl glycol and 1,4-(2,2,3,3-tetramethyl)butane diol, and the like. Examples of polymeric diols include the polyoxyalkylene diols, the polyester diols of organic dicarboxylic acids and diols, and the polylactone diols having a molecular weight of 106 to about 2,000. Examples of polymeric diols include polyoxyethylene diols such as the Carbowax™ diols available from Union Carbide, Danbury, Conn., the polyoxytetramethylenediols such as Polymeg™ diols available from Quaker Oats Company, Chicago, Ill., the polyester diols such as the Multron™ poly(ethyleneadipate)diols available from Mobay Chemical Company, and the polycaprolactone diols such as the PCP™ diols available from Union Carbide.

Examples of polymeric aromatic polyols include the polyester diols that are prepared from aromatic dicarboxylic acids such as o-, m-, and p-phthalic acid and diols such as diethylene glycol, triethylene glycol, or glycol.

Preferred polyols are the esterified products of an aliphatic diol, such as butylene glycol and neopentyl glycol, and a lactone, preferably caprolactone.

In an alternative Reaction Sequence, preferably the esterified sulfopolyols of formula (III) are reaction products of diols and lactones. They are obtained, in situ, in a modification of the process for the preparation of the polyurethane thermoplastic polymer of the invention by the steps B2 and C2:

(a) (Step B2) reacting the sulfodiol formula (III) and any excess polyol of formula (II) with a lactone of formula (VI) to form a lactonized sulfo-organodiol (step B2), then reacting the lactonized sulfo-organodiol with a polyisocyanate to form an isocyanate-terminated sulfopolyurethane of formula (VIII) having a sulfonate equivalent weight of sulfo group per molecular weight of about 2,000 to 8,000.

(b) (Step C2) reacting the isocyanate-terminated sulfopolyurethane (VIII) with an amino- or hydroxyorganic group-terminated hydrophobic monomer or oligomer of formula IX composition, in an inert organic solvent (ie. tetrahydrofuran, methyl ethyl ketone, dichloroethane, etc.) forming an isocyanate-terminated polyurethane or polyurea composition (SPUR) having sulfo-organic segments, and preferably 3 to 80 percent by weight of total polymer comprises hydrophobic segments, which is subsequently chain extended by reaction with water or an organic diamine or organic diol forming a sulfo-polyurethane/polyurea composition;

(c) Step D optionally can follow as described above.

Alternatively, the isocyanate-terminated sulfopolyurethane of formula (VIII) can be prepared by (Step B3) a chain-extending reaction of the sulfopolyol of formula (III) with a polyisocyanate of formula (IV) and a polyol or polyamine of formula (V).

Sulfoaryl- and sulfoalkyl-dicarboxylic acids useful for preparation of the isocyanate-terminated sulfopolyurethane of formula (VII) are any of the known sulfoaryl- and sulfoalkyldicarboxylic acids. Examples of these include sulfoalkanedicarboxylic acids such as sulfosuccinic acid, 2-sulfoglutaric acid, 2,5-disulfoadipic acid, 2-sulfododecanedioic acid, sulfoarenedicarboxylic acids such as 5-sulfonaphthalene-1,4-dicarboxylic acid, 4,5-disulfonaphthalene-1,8-dicarboxylic acid, sulfobenzylmalonic acids such as those described in U.S. Pat. No. 3,821,281; and sulfofluorenedicarboxylic acids such as 9,9-di(2'-carboxyethyl)fluorene-2-sulfonic acid described in British Patent No. 1,006,579. It is understood that the corresponding lower alkyl esters, halides, anhydrides, and salts of the above sulfonic acids of formula (I) can also be used in the preparation.

Diisocyanates of formula (IV) that can be used to react with the sulfodiol of formula (III) to form the isocyanate-terminated sulfopolyurethanes of formulae (VII) or (VIII) are any of the well-known diisocyanates. Preferred diisocyanates are hexamethylene diisocyanate, tolylene diisocyanate, isophorone diisocyanate, 4,4'-diisocyanatodicyclohexylmethane, 3,5,5-trimethyl-1-isocyanato-3-isocyanatomethylcyclohexane, and 4,4'-diphenylmethane diisocyanate (MDI). Other diisocyanates include those described in U.S. Pat. Nos. 3,700,643 and 3,600,359, among many others. Mixtures of diisocyanates can also be used such as a mixture of MDI and hexamethylene diisocyanate.

The isocyanate-terminated sulfopolyurethanes of formula VII or VIII are then reacted with polyamine or polyol functional hydrophobic compositions to produce SPUR compositions of formula (XI) of the present invention. The hydrophobic compounds of formula (IX) can be provided by polysiloxane groups, pendant higher alkyl groups, or fluorochemical groups.

Examples of useful polysiloxanes include amino organic group-terminated polysiloxanes of the formula

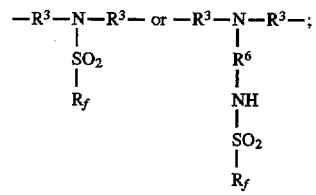

wherein $R^3$ and $R^4$, are as previously defined, and $R^7$ is H—, CH$_3$—, C$_2$H$_5$—, or other lower alkyl groups. These are known compounds which can be prepared by the procedures disclosed in U.S. Pat. Nos. 4,098,742 and 5,091,483.

Organopolysiloxane diamines useful in preparing the hydrophobic compounds of formula (IX) which can be a precursor of the SPUR compositions of this invention are those for which e is an integer of about 10 to about 300, preferably about 10 to 100, wherein $R^3$, $R^4$, and $R^7$ are as previously defined.

Hydroxyorganic group-functional polysiloxanes useful in preparing compounds of formula (IX) (Step C1 or Step C2) are also known compounds and are described in U.S. Pat. Nos. 4,098,742, 4,898,918, and 5,128,408, which are incorporated herein by reference.

The hydrophobic compounds of formula (IX) can also comprise amino organic group-terminated divalent organic groups having the structure

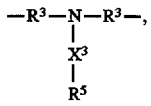

each having an alkyl pendant group, wherein $R^3$, $R^5$, and $X^3$ are as defined above. These are known compounds which can be prepared by the reaction of a blocked di(hydroxyalkyl)amine with a mono(higher alkyl) isocyanate wherein $R^3$ is as previously defined.

Alternatively, hydrophobic compounds of formula (IX) can be prepared from divalent organic groups having one of the structures below or quaternary salts thereof:

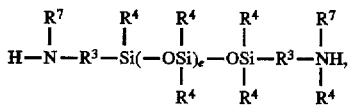

and each comprising a fluorocarbon pendant group which can be prepared by the reaction of a perfluoroalkyl sulfonamide with ethylene chlorohydrin, wherein $R^3$ is as defined above, and $R^6$ is a divalent group selected from the group consisting of alkylene groups of 2 to about 12 carbon atoms. $R_f$ is a saturated monovalent fluoroaliphatic group having at least four fully-fluorinated carbon atoms. $R_f$ can be straight, branched or, if sufficiently large, cyclic fluoroaliphatic group or combinations thereof, such as alkylcycloaliphatic radicals. The skeletal chain in the fluoroaliphatic radical can include catenary oxygen, hexavalent sulfur, and/or trivalent nitrogen atoms bonded only to carbon atoms of the skeletal chain, such hetero atoms providing stable linkages between fluorocarbon portions of the $R_f$ radical. A fully fluorinated radical is preferred, but hydrogen and chlorine atoms may be present as substituents provided that not more than one atom of each is present for every two carbon atoms. While $R_f$ can contain a large number of carbon atoms, compounds where $R_f$ is not more than 20 carbon atoms will be adequate and preferred since larger radicals usually represent a less efficient utilization of the fluorine than is possible with shorter chains. Fluoroaliphatic radicals containing from about 6 to about 12 carbon atoms are most preferred. Generally $R_f$ will contain 40 to 78 weight percent fluorine. The terminal portion of the $R_f$ group preferably has at least four fully fluorinated carbon atoms, e.g. CF$_3$CF$_2$CF$_2$CF$_2$—, and the preferred compounds are those in which the $R_f$ group is fully or substantially completely fluorinated, as in the case where $R_f$ is perfluoroalkyl, e.g. CF$_3$(CF$_2$)$_m$—, wherein m can be an integer of 1 to 19. Suitable $R_f$ groups include, for example, C$_8$F$_{17}$—, C$_6$F$_{13}$—CH$_2$CH$_2$—, and C$_{10}$F$_{21}$—CH$_2$CH$_2$—.

Optionally, the hydroxy-functional compounds of formula IX can be introduced into Step B3 and the SPUR compositions of formula IX will then be formed in a single reaction.

Step A of the process for the preparation of polyurethane polymeric composition of the invention is performed by the reaction of one or more sulfoalkane or sulfoarene dicarboxylic acids with an excess of 0.2 equivalents or more of polyol(s), this amount being in a range from 1.2 to 8 equivalents of polyol(s), preferably 3 to 5 equivalent, i.e., an amount that will provide to the sulfo-organic segment at least one sulfo group per about 800 to 5,000, preferably 1,200 to 2,000, of molecular weight. The sulfopolyol and excess polyol is then reacted with excess polyisocyanate to form a isocyanate-terminated sulfopolyurethane, the amount of polyisocyanate being up to 15 mole % excess, preferably 1.2–10 mole % excess. The concentrations of the reactants in the solvent are adjusted so that the final reaction mixture has about 20 to 60 percent solids.

Steps C1 or C2 are performed by reacting up to one molar equivalent of amino- or hydroxy-group-functional hydrophobic compound relative to the isocyanate equivalent of the isocyanate terminated polyurethane compounds (formulas VII or VIII) formed by Steps B1, B2, or B3. The reaction sequence B1, C1, or B2/B3, C2 is carried out in an inert solvent at a solids concentration of about 15 to 60%, preferably 15 to 30% in an inert water miscible solvent.

Step C1, the water initiated chain extension of the isocyanate-terminated polyurethane having both sulfo-organic and hydrophobic segments, is performed by adding to the reaction mixture of Step B about 2 to 5 mole equivalents of water per mole equivalent of the polyurethane, the solids concentration having been adjusted to 15 to 30%.

Step C2, the polyamine or polyol initiated extension of the isocyanate-terminated polyurethane, is performed as described in Step C1 by adding 0.8 to 1.0 mole equivalents of the polyamine or polyol in place of the 2 to 5 mole equivalents of water.

The reaction mixture obtained following Steps C1 or C2 is a clear solution. It can be stored as is or immediately used as a coating composition, the chain extended polyurethane having excellent adherence to a variety of surfaces, including, for example, wood, metals, ceramics, glass, paper, painted surfaces, plastics, and concrete to provide low energy coatings.

As is known in the coating art, various additives can be added to the solvent solution of the chain extended polymer including, for example, soluble coloring materials and pigments, plasticizers, viscosity modifiers, coalescing agents, polymeric latices, water-soluble polymers, inhibitors, antioxidants, fillers, and the like.

Step D can be performed in a distillation apparatus into which the solvent solutions of Step C1 or C2 are charged along with about an equal volume of water and the solvent distilled from the water-solvent mixture, with additional water being added to the mixture until all the solvent is removed. During the distillation, water is preferably added to maintain a SPUR composition concentration in water of about 10 to 40% by weight. The thus obtained SPUR composition dispersion is stable without the addition of dispersing or emulsification agents.

The aqueous dispersion of the SPUR compositions of the invention can be used to prepare self-supporting films useful for the packaging of gums and tacky materials.

Release coatings of the present invention can be applied as dispersions or solutions to substrates to prevent the adherence of various materials and to be used as release coatings for adhesive roll and sheet materials, e.g., adhesive tapes, where by control of the hydrophobic segment content, or more specifically of the polysiloxane segment, release values of from about 1.0 to 200 N/dm, preferably to 125 N/dm or more can be obtained. This makes them useful in a variety of applications. The release coatings preferably are receptive to aqueous and solvent based inks, thus providing printability to pressure-sensitive adhesive tapes utilizing the coating as a back size.

The invention also provides for substrates bearing ink-receptive coatings having specific release characteristics toward adhesive materials, particularly acrylate, methacrylate, acrylamide, Kraton™ (Shell Chemical Co.), and natural rubber-based pressure-sensitive adhesives.

Low surface energy, ink-receptive coatings of the SPUR compositions of the invention which contain 28 or more percent by weight polysiloxane segments have shown release values against Kraton-based pressure-sensitive adhesives of 2.2 N/dm to 0.5 N/dm or less while coatings containing less than 28 percent by weight of polysiloxane segments have shown release values of 2.2 N/dm to 40 N/dm or more.

Aqueous dispersions of the SPUR compositions of the invention when admixed with an aqueous colloidal dispersion of vanadium oxide provide antistatic ink receptive coatings. Aqueous colloidal dispersions of vanadium oxide are disclosed in U.S. Pat. No. 5,203,769.

Test Procedures

"Release Value" Test

Pressure-sensitive adhesive tapes (#355 Box Sealing Tape, having a Kraton™ based adhesive, and #845 Book Tape, having an acrylate based adhesive, both tapes available from 3M, St. Paul, Minn.) are applied to the surface of a coating of the SPUR compositions on either a flame treated biaxially oriented polypropylene (BOPP) or corona treated polyethylene terephthalate (PET) film by rolling a 2.2 kg rubber roller over the tape once. The coated substrate/test tape laminate is cut into 2.5×25 cm strips and the "release value", which is the force (peel force), reported in Newtons per decimeter of width, required to pull the test tape away from the SPUR composition coated substrate at an angle of 180° at a rate of 230 cm/min.

"Readhesion Value" Test

The pressure sensitive tape, as removed from the SPUR composition coated substrate, is applied to the surface of a clean glass plate by rolling a 2.2 kg rubber roller over the tape once. The readhesion value is measured by pulling the tape from the glass surface at an angle of 180° and a stripping speed of 230 cm/minute.

"Ink Receptivity" Test

Ink receptivity of SPUR composition coated substrates was measured by a modification of the procedure of ASTM D3359-92 Method B—Cross Cut Tape Test for measuring adhesion as follows:

1) A stripe of ink 10 cm wide is applied to the SPUR composition coated surface of the substrates and dried according to the ASTM procedure;
2) The stripe is hatch scratched according to the ASTM procedure;
3) A pressure-sensitive tape (as described) above is applied to the hatch scratched stripe using uniform finger pressure to expel any entrapped air bubbles;
4) The test samples are aged at room temperature (22° C.) for 24 hours;
5) The tape is removed from the hatch scratched stripe according to the ASTM procedure;
6) The hatch scratched stripe is inspected for failure and qualitatively graded according to the following scale:
5—no ink removal by the tape
4—less than 5% of inked area removed
3—5% to 15% of inked area removed
2—15% to 65% of inked area removed
1—greater than 65% of inked area removed Objects and advantages of this invention are further illustrated by the following Examples, but the particular materials and amounts thereof recited in these examples, as well as other conditions and details, should not be construed to unduly limit this invention.

EXAMPLE 1

A sulfo-organodiol-diol mixture, having a hydroxyl equivalent weight of 460 g/mole, was prepared according to the general procedure described in Example 1 of U.S. Pat. No. 4,738,992, utilizing Carbowax™ 600 (2400 g, 4 mole, available from Union Carbide, Danbury, Conn.) as the polyol and dimethyl sodium sulphoisophthalate (296 gm, 1 mole, available from E. I. DuPont deNemours and Co., Wilmington, Del.) as the sulfoacid.

A mixture of bis-(4-isocyanatocyclohexyl)methane, (39.3 g, 0.30 mole equivalents, available as Desmodur W™ from Mobay Chemical Company, Pittsburg, Pa.), methyl ethyl ketone (40 g), and ethane sulfonic acid (0.04 g, available from Aldrich Chemical, Milwaukee, Wis.) was charged into a reactor and heated, with stirring, to about 65° C. A portion of the above described sulfo-organodiol-diol solution (116.2 g) was added to the reaction mixture at a rate such that the reaction temperature did not exceed about 80° C. After the exotherm had subsided, 0.07 g dibutyltin dilaurate was added and the mixture stirred and heated at about 65° C. for 4 hours. Methyl ethyl ketone (about 250 g) was added to the reaction mixture to produce an approximately 20% solids solution of an isocyanate terminated sulfo-organodiol-diol mixture.

A 5,000 MW aminopropylpolysiloxane was prepared by purging a solution of bis(3-aminopropyl) tetramethyl disiloxane (14.96 g, 0.06 moles, available from Aldrich Chemical Co.) in octamethylcyclotetrasiloxane (352.9 g, available from General Electric Co.) with argon for 20 minutes, heating the solution to 150° C., adding 0.06 g of a 50% solids (w/w) aqueous cesium hydroxide solution and maintaining the resulting reaction mixture of 150° C. for an additional 6 hours. The reaction mixture was then cooled to 70° C., neutralized with excess triethyl amine and acetic acid, and heated to 130°–160° C. under 10 mm Hg vacuum for at least 5 hours to remove cyclic siloxanes. An aminopropylpolysiloxane having a theoretical molecular weight of 5,000 was obtained after the reaction mixture was cooled to ambient temperature and filtered to remove cesium acetate.

A solution of the aminopropylpolysiloxane (31.2 g, 0.006 mole) having the average formula:

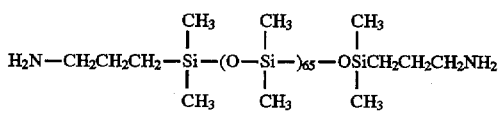

in methyl ethyl ketone (200 gms) was added to the previously described isocyanate terminated sulfo-organodiol-diol mixture over a period of 30 minutes and the resulting mixture was heated, with stirring at about 65° C. under a gentle flow of nitrogen for about one hour. Water (10 g) was added to the reaction mixture and the mixture heated, with stirring, for an additional two hours at about 80° C.

A portion of the reaction mixture was removed from the reaction vessel to provide a solution of a water dispersible SPUR composition of average formula:

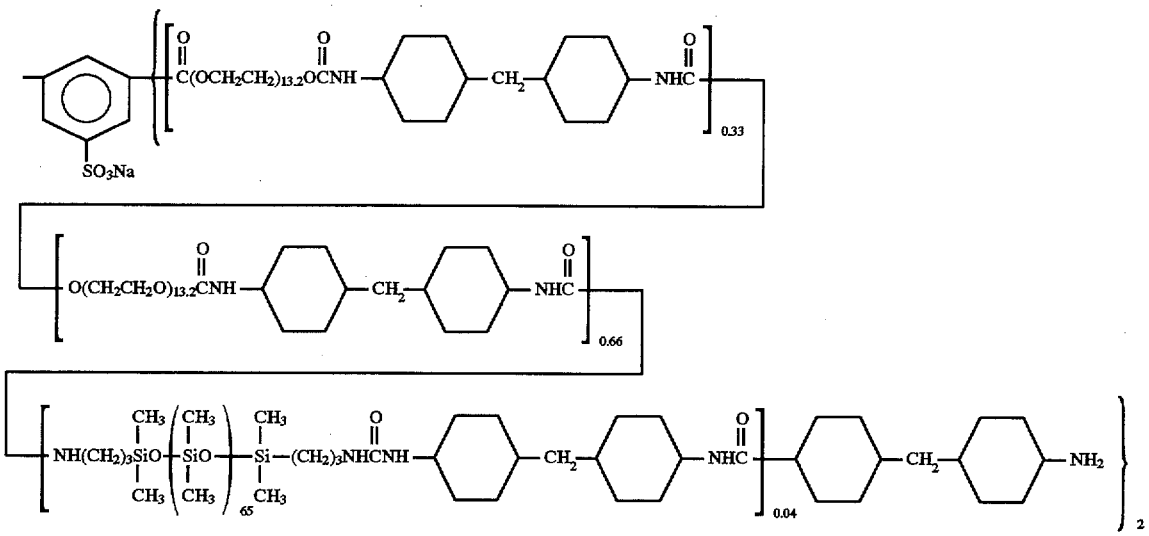

with a sulfonate equivalent weight of 4200 g/mole and a silicone content of 17 percent.

Surfaces coated with the reaction solution and dried could be written upon with a water based marking pen.

EXAMPLE 2

A water dispersible SPUR composition was prepared according to the procedure of Example 1 and the reaction mixture was heated to 85° to 90° C., water (650 g) was added to the reaction mixture over a period of about 30 minutes and methyl ethyl ketone solvent distilled until a test of the distillate indicated that all of the MEK had been removed. Water was added to the stripped reaction mixture to provide a 20% solids dispersion of the composition obtained in Example 1.

EXAMPLE 3

A lactonized sulfo-organodiol-diol mixture was prepared by heating a mixture consisting of dimethyl-5-sodiosulfoisophthalate (296 g, 1 mole, vacuum dried for 24 hours at 120° C., available from E.I. DuPont deNemours and Co., Wilmington Del.), neopentyl glycol (520 g, 5 moles, available from Aldrich Chemical Co.) and methyl ethyl ketone (100 g) to about 80°–90° C. under a nitrogen purge. Tetrabutyl-titanate (0.5 g ,0.06% by weight, available from Aldrich Chemical Co.) was added to the reaction mixture and the temperature was increased to 220° C. with the accompanying distillation of methanol. After approximately 45 minutes, the reaction temperature was reduced to 200° C. and maintained at that temperature, with stirring, for five hours. The reactants were cooled to 180° C. and ε-caprolactone (912 g, 8 moles, available from Aldrich Chemical Co.) containing 0.55 g of dibutyltin dilaurate added to the reaction mixture over a period of one hour while maintaining the temperature at 150° to 180° C. The reaction mixture was maintained at 150° C. with stirring and under nitrogen purge for an additional two hours at which time the pressure was reduced to 0.5 torr to obtain a mixture consisting of 1 mole of lactonized sulfo-organodiol and 3 moles of lactonized diol (1690 g) as a clear light yellow liquid having an hydroxyl equivalent weight of 230 grams per mole.

The thus obtained sulfo-organodiol-diol mixture (23 g) was diluted with MEK (27 g) and added to a solution of toluene diisocyanate (9.6 g, 0.055 moles, TDI, available from Aldrich Chemical Co.) in MEK (20 g) using the procedure of Example 1 except that no ethane sulfonic acid was used. Dibutyltin dilaurate (0.02 g) was added to the reaction mixture after the exotherm subsided and the mixture heated, with stirring, for 3 hours at about 75° C. The reaction mixture was diluted with MEK (110 g) and a solution of the 5000 molecular weight (no. average) aminopropylpolysiloxane (12.5 g, 0.0025 mole prepared as previously described) in MEK (50 g) was added to the mixture, with stirring, over a period of about one-half hour while maintaining the temperature of the mixture at about 75° C. After completion of the addition, the mixture was maintained at 75° C. with stirring for 1.5 hours. Water (10 g) was added to the clear reaction solution and the reaction mixture was heated at about 80° C., with stirring, for an additional 2 hours. MEK was then distilled from the reaction mixture with water being added to the mixture at approximately the same rate as the MEK was removed to provide an approximately 20% solids dispersion of the SPUR composition. The composition had a sulfo group equivalent weight of about 3300 and contained about 28% by weight of polysiloxane.

The SPUR composition had segments having the overall general formulae:

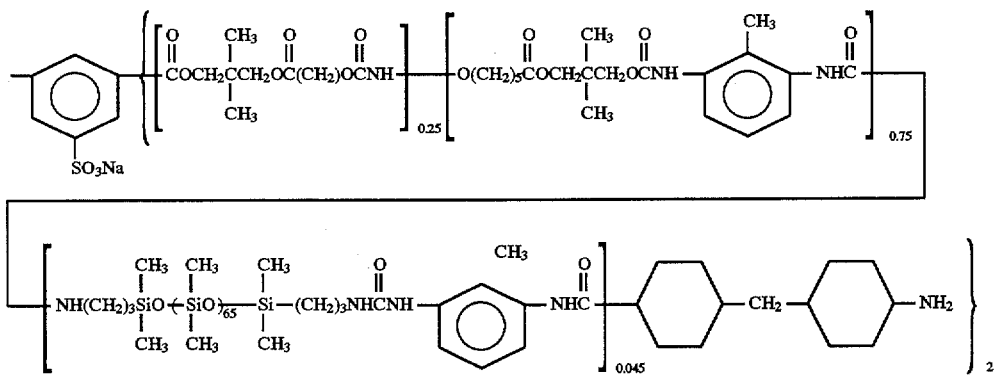

EXAMPLES 4–8

The SPUR compositions of Examples 4–8 were prepared using the general procedure of Example 1, except that the TDI solution was added to the sulfo-organodiol-diol mixture in a single charge, using the reactants indicated in Table 1.

TABLE 1

| | Reactants Charge (in Grams) | | | | |
|---|---|---|---|---|---|
| Example No. | 4 | 5 | 6 | 7 | 8 |
| Sulfodiol (Expl. 3) | 16.1 | 18.7 | 21.0 | 22.0 | 115 |
| TDI (MEK) | 8.9 (10) | 9.4 (10) | 10.2 (10) | 9.7 (10) | 47.8 (10) |
| CHDM[1] | 2.12 | 1.7 | 1.3 | 0.3 | 0.0 |
| Aminopropyl Polysiloxane (MEK) | 0.75 (20) | 2.25 (30) | 4.0 (40) | 6.25 (60) | 62.5 (500) |
| MEK[2] | 75 | 110 | 122 | 140 | 1000 |
| % Silicone | 3 | 7 | 11 | 16 | 28 |

[1] 1,4-cyclohexanedimethanol, available from Aldrich Chemical Co.
[2] MEK charge added to the reaction mixture prior to the addition of the aminopropylpolysiloxane charge.

MEK solutions of the SPUR compositions of Examples 4–8 were inverted to aqueous dispersions by the procedure described in Example 3 and diluted with water to about 3% solids. Each dispersion was coated onto flame treated biaxially oriented polypropylene (BOPP) and onto corona treated poly(ethyleneterephthalate) (PET) using a No. 6 Meyer bar and dried by heating at 110° C. for 3 minutes to obtain release coatings having a thickness of 0.3 to 0.4 micrometers (μ). Release values and Readhesion values (an average of three tests) were obtained using the above described "Release Value" and "Readhesion Value" tests. "Initial" value [in Newtons/decimeter (N/dm)] is the force necessary to peel the tape from the coated surface after the laminate had been held at room temperature (22° C.) for three days. "Aged" release (in N/dm) is the force required to peel the tape from the coated surface after the laminate had been aged at 65° C. for three days. The data obtained are shown in Table 2.

TABLE 2

Release Values (N/dm) as a Function of the
% Silicone in Polyurethane Composition

|  |  | Example (% Silicone) | | | | |
| --- | --- | --- | --- | --- | --- | --- |
|  | Tape | 4 (3) | 5 (7) | 6 (11) | 7 (16) | 8 (28) |
| 1[a] | Initial[d] | 38.5 | 20.9 | 9.9 | 4.6 | 2.2 |
|  | Readhesion[e] | 37.4 | 35.2 | 34.1 | 37.4 | 39.6 |
|  | Aged[d] | 46.2 | 34.1 | 25.4 | 5.0 | 2.2 |
|  | Aged Readhesion[e] | 34.1 | 33.0 | 26.4 | 34.1 | 39.6 |
| 2[b] | Initial[d] | 39.6 | 22.0 | 25.3 | 22.0 | 8.2 |
|  | Readhesion[e] | 38.5 | 40.7 | 30.8 | 39.6 | 35.2 |
|  | Aged[d] | 39.6 | 23.1 | 27.5 | 26.4 | 16.5 |
|  | Aged Readhesion[e] | 38.5 | 36.3 | 28.6 | 30.8 | 29.7 |
| 3[c] | Initial[d] | 16.5 | 14.3 | 13.0 | 1.6 | 1.1 |
|  | Readhesion[e] | 80.3 | 102 | 85.8 | 104 | 119 |
|  | Aged[d] | 158 | 72.6 | 66 | 1.6 | 1.6 |
|  | Aged Readhesion[e] | 82.5 | 88 | 93.5 | 115 | 126.5 |

[a]Tape 1, #850 pressure sensitive tape having an acrylamide based adhesive with a peel value from glass of 41 N/dm, available from 3M, St. Paul, MN.
[b]Tape 2, #232 Masking Tape having a natural rubber adhesive and a peel value from glass of 46 N/dm, available from 3M Company, St. Paul, MN.
[c]Tape 3, #355 Box Sealing Tape, having a peel value from glass of 91 N/dm, available from 3M Company, St. Paul, MN.
[d]The initial release values from coatings having 3 to 28% by weight of silicone.
[e]Readhesion values from glass following removal from the release coating.

The initial peel release values for the composition of Example 4 (3% silicone) against Tapes 1 and 2, which is shown in Table 1, were too high to allow that composition to function as a release coating for those tapes. The lower initial peel release values for the compositions of Examples 5–8 (7% to 28% silicone) against all three tapes showed that they could function as effective release coatings for a broad range of adhesive formulations. Low release values for aged samples were obtained only from the compositions of Examples 7–8 (16%–28% silicone). Examples 5–8 provided useful release properties.

Release properties of coatings of the SPUR compositions of the invention were approximately the same whether the coatings were prepared from the aqueous dispersions or from MEK solutions with the exception that coatings of compositions having 11% or less silicone demonstrated lower peel release values when delivered from MEK. For example, the initial peel release value for Tape 1 against a coating composition containing 3% silicone was 14.3 N/dm when delivered from MEK while the same composition produced an initial peel value of 38.5 N/dm when delivered from an aqueous dispersion. This release value is useful for certain applications.

Ink receptivity of the SPUR compositions were determined using the above described "Ink Receptivity" test. Coatings were applied to flame treated biaxially oriented polypropylene (BOPP), corona treated BOPP, and corona treated poly(ethylene terephthalate) film substrates. SPUR compositions having 3 to 28% silicone content coated on PET had an ink receptivity rating of 5. Compositions having 3, 7, and 11% silicone content coated on corona treated BOPP had an ink receptivity value of 1 while compositions having 16 and 28% silicone content coated on the same substrate had an ink receptivity value of 2. The same compositions coated on flame treated BOPP had ink receptivities of 5.

These data demonstrate the interdependence of substrate priming and coating adhesion and clearly show that excellent ink receptivity can be realized with the SPUR compositions of the present invention having a silicone content of 3% or more provided that the substrate is suitably primed.

EXAMPLE 9

The general procedure of Example 1 was repeated using the reactants:

Sulfo-organodiol-diol of Example 3 (23.0 g, 0.1 mole equivalent) in MEK (50 g), toluene diisocyanate (9.7 g, 0.11 mole equivalent), dibutyltin dilaurate (4 drops), aminopropylpolysiloxane had a theoretical molecular weight of 20,000 (12.5 g, 0.025 moles) and MEK (50 gm). The 20,000 MW aminopropylpolysiloxane was prepared by purging a solution of bis(3-aminopropyl) tetramethyl disiloxane (3.74 g, 0.015 moles) in octamethylcyclotetrasiloxane (352.9 g) with argon for 20 minutes, heating the solution to 150° C., adding 0.06 g of a 50% solids (w/w) aqueous cesium hydroxide solution and maintaining the resulting reaction mixture of 150° C. for an additional 6 hours. The reaction mixture was then cooled to 70° C., neutralized with excess triethyl amine and acetic acid, and heated to 130°–160° C. under 10 mm Hg vacuum for at least 5 hours to remove cyclic siloxanes. An aminopropylpolysiloxane having a theoretical molecular weight of 20,000 was obtained after the reaction mixture was cooled to ambient temperature and filtered to remove cesium acetate. The SPUR composition had a sulfonate equivalent weight of about 3,300 and a silicone content of 28 percent by weight.

EXAMPLE 10

A sulfo-organodiol-diol mixture was prepared according to the general procedure of Example 1 using dimethyl sodium sulphoisophthalate and neopentyl glycol (available from Aldrich Chemical) in a 1:5 ratio and 0.06 wt. % tetrabutyl titanate as a catalyst. On cooling, the sulfo-organodiol-diol mixture solidified to a white solid having a hydroxy equivalent weight of 94 g/mole.

The sulfo-organodiol-diol mixture (1949.7 g, 20.74 moles) was melted by heating in a circulating air oven maintained at 105° C. and charged into a reactor maintained at 170° C. under a $N_2$ atmosphere and dibutyl tin dilaurate (0.71 g) added to the melt. Freshly distilled ε-caprolactone (2364.36 g, 20.74 moles) containing dibutyl tin dilaurate (0.71 g) was added to the catalyzed melt as a slow stream, causing the reaction temperature to drop to approximately 150° C. Subsequent to the completion of the addition, the reaction mixture began to exotherm and the heat source was turned off as the reaction temperature reached 180° C. The reaction was maintained at this temperature for approximately 2.5 hours, at which time it was cooled to ambient temperature and the chain extended sulfo-organodiol-diol mixture was isolated as a viscous amber colored fluid.

A solution of diethanol amine (52.6 g, 0.5 moles, available from Aldrich Chemical) in methyl ethyl ketone (MEK, 52 mL) was placed in a reactor under a $N_2$ atmosphere and the solution was dried by distilling approximately 20 mL of MEK. The solution was cooled to approximately 50° C. and a solution of octadecyl isocyanate (148.05 g, 0.5 mole, available from Aldrich Chemical) in MEK (148 mL) was added to the diethanol amine solution over a period of approximately 30 minutes with vigorous stirring, during which addition the temperature of the reaction mixture increased to approximately 80° C. The reaction mixture was then diluted to approximately 20% solids with MEK, cooled and N-octadecyl-N',N'-bis hydroxyethyl urea (160 g, mp 40° C.) crystallized from solution.

A mixture of the chain extended sulfo-organodiol-diol mixture (50 g, 0.1 mole), N-octadecyl-N',N'-bis-hydroxyethyl urea (33.6 g, 0.083 mole) and MEK (93.6 g) were charged into a reactor under a $N_2$ atmosphere and the mixture was dried by distilling off approximately 10 g of MEK.

The mixture was cooled to 75° C., a solution of bis-(4-isocyanatocyclohexyl)methane, (51.43 g, 0.196 mole) in MEK (51 g) was added and after approximately 30 minutes dibutyl tin dilaurate (0.07 gms, 0.05 wt. %) was added and the resulting mixture was heated at 75° C., with stirring and under a $N_2$ atmosphere, for approximately 8 hours. Water (20 g) was added to the reaction mixture and the mixture was heated, with stirring, for an additional two hours at approximately 75° C.

Additional water (385 g) was added to the reaction mixture and MEK was distilled from the mixture to produce an approximately 25% solids dispersion of the SPUR composition. A portion of the dispersion was diluted to 2% solids and coated on a PET film, dried and fused at about 80° C. to produce a clear, water repellent coating to which pressure sensitive adhesive tapes would not readily adhere.

EXAMPLE 11

A solution of $C_8F_{17}SO_2N(CH_2CH_2OH)_2$ (88.05 g, 0.15 moles, prepared as described in U.S. Pat. No. 4,289,892, Example 2, which procedure is incorporated herein by reference) and a sulfo-organodiol (41.5 g, 0.025 mole, prepared as described in Example 9 except that the hydroxy equivalent was 815 g/mole) in MEK (144 gms) was heated to 120° C. Approximately 60 g of MEK was distilled from the mixture, after which the reaction temperature was reduced to approximately 75°–80° C. TDI (30.45 gms, 0.175 moles) was added to the reaction mixture along with two drops of dibutyl tin dilaurate and the reaction mixture was maintained at 80° C. for 8 hours, after which it was allowed to cool to ambient temperature. MEK (40 gms) and water (approximately 10 mL) was added to the reaction mixture and the mixture was stirred at ambient temperature for approximately 2 hours to complete the reaction of any residual isocyanate. Additional water (150 g) was then added to the mixture and the polyurethane polymeric composition was inverted into an approximately 25% solids aqueous dispersion according to the procedure of Example 10. The resulting latex was diluted to approximately 2% solids, coated on corona treated PET film using #16 Mayer bar, and heated to 80° C. for approximately 15 minutes to produce a low energy coating which displayed good release properties toward natural rubber and acrylate based adhesive compositions.

Various modifications and alterations of this invention will become apparent to those skilled in the art without departing from the scope and spirit of this invention, and it should be understood that this invention is not to be unduly limited to the illustrative embodiments set forth herein.

We claim:

1. A water dispersible polymeric composition which comprises at least one trivalent arylsulfonate group-containing segment wherein two of said valences are linked to carboxylic add functionality and one valence is linked to a sulfonate group, said segment having a molecular weight in the range of 800 to 5,000, which segment comprises at least one urethane or urea group, said composition also comprising at least one hydrophobic segment which includes at least one segment selected from the group consisting of polysiloxane segments, pendant fluorochemical segments having a structure

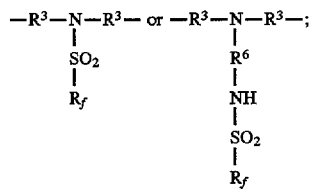

or quaternary salts thereof, wherein $R^3$ is a divalent organic group selected from the group consisting of straight chain or branched alkylene groups having 2 to 12 carbon atoms, and arylene groups having 6 to 20 carbon atoms;

$R^6$ is a divalent group selected from the group consisting of alkylene groups of 2 to 12 carbon atoms;

$R_f$ is a monovalent saturated fluoroaliphatic group having 6 to 12 carbon atoms, at least four of which are fully-fluorinated carbon atoms, and pendant higher alkyl-containing segments having the formula $-X^3-R^5$ wherein $X^3$ is a covalent bond,

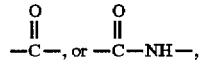

and $R^5$ is an alkyl group having in the range of 4 to 60 carbon atoms, which hydrophobic segment comprises at least one urethane or urea group, said composition when dried having release properties.

2. The polymeric composition according to claim 1 wherein said composition has a sulfonate equivalent weight of 2,000 to 8,000.

3. The polymeric composition according to claim 1 wherein said hydrophobic segments comprise in the range of 3–80% by weight of the composition.

4. The polymeric composition according to claim 1 wherein said hydrophobic segment has a number average molecular weight in the range of 200 to 20,000.

5. The polymeric compositions according to claim 1 wherein said hydrophobic segment comprises said pendant higher alkyl segment.

6. The polymeric composition according to claim 1 wherein said hydrophobic segment comprises said polysiloxane segment.

7. The polymeric composition according to claim 6 wherein said polysiloxane segment comprises the structure

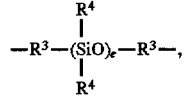

wherein $R^3$ is a divalent organic group selected from the group consisting of straight chain or branched alkylene groups having 2 to 12 carbon atoms, and arylene groups having 6 to 20 carbon atoms;

$R^4$ is a monovalent group selected from the group consisting of alkyl groups of one to twelve carbon atoms, aralkyl groups of 6 to 10 carbon atoms, and aryl groups of 6 to 10 carbon atoms, with at least 70% of $R^4$ being methyl; and e is an integer of from 10 to 300.

8. The polymeric composition according to claim 1 wherein said composition has a weight average molecular weight in the range of 20,000 to 500,000.

9. The polymeric composition according to claim 8 wherein said molecular weight is in the range of 30,000 to 100,000.

10. The polymeric composition according to claim 5 wherein said hydrophobic segment has the structure

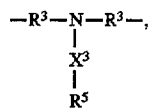

wherein $R^3$ is a divalent organic group selected from the group consisting of straight chain or branched alkylene groups having 2 to 12 carbon atoms, and arylene groups having 6 to 20 carbon atoms; and $R^5$ is a monovalent group selected from the group consisting of alkyl groups of 4 to 60 carbon atoms, and $X^3$ is selected from the group consisting of a covalent bond, a carbonyl group, and an amide group.

11. The polymeric composition according to claim 10 wherein $R^5$ of said hydrophobic segment comprises said pendant alkyl group having in the range of 12 to 30 carbon atoms.

12. The polymeric composition according to claim 1 wherein said hydrophobic segment comprises said pendant fluorochemical segment.

13. A polymeric composition comprising 1) at least one sulfonate group containing organic segment, said sulfonate group containing organic segment comprising at least one urethane/urea group and having a molecular weight in the range of 800 to 5,000, and 2) at least one hydrophobic segment which includes at least one moiety selected from the group consisting of polysiloxane moieties, pendant fluorochemical moieties, and pendant higher alkyl moieties having in the range of 4 to 60 carbon atoms, said hydrophobic segment comprising at least one urethane/urea group, wherein said polymeric composition comprises the structural formula

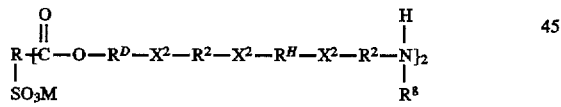

wherein

R is a trivalent aryl group comprising 6 to 12 carbon atoms, or a trivalent alkyl group comprising 6 to 12 carbon atoms;

M is hydrogen or a cation;

$R^D$ is selected from the group consisting of a) at least one of (1) a divalent straight chain or branched organic group of 20 to about 150 carbon atoms in units of 2 to 12 methylene groups which can be separated by 1 to 50 catenary oxygen atoms or by 1 to 30 oxycarbonyl groups

and (2) arylene groups of 6 to 10 carbon atoms which can be separated by 1 to 50 catenary oxygen atoms or by 1 to 30 oxycarbonyl groups

the organic group having a molecular weight of 400 to 2500;

b) an organic group selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylene-methylenephenylene group, the organic group optionally substituted by up to four lower alkyl groups having 1 to 4 carbon atoms and a total of up to 15 carbon atoms, which organic group can be chain extended through an esterification reaction by a transesterification reaction between a diol terminated ester precursor and a lower aliphatic diester of a aliphatic diacid of from 2 to 12 carbons or an aromatic diacid of from 8 to 12 carbons or reaction between a diol terminated ester precursor and an aliphatic lactone of 4 to 6 carbons; and c) $\{-R^1-(X^2-R^2-X^2-R^1)_n-\}$, wherein n=0 or an integer of 1 to 5, produced by the reaction of a polyol with an isocyanate having the structure OCN—$R^2$—NCO to produce a hydroxy terminated group having a molecular weight of from 500 to 2000;

$R^1$ is straight or branched chain alkylene group having 2 to 12 carbon atoms or an arylene group having 6 to 10 carbon atoms;

$X^2$ is

$R^2$ is selected from the group consisting of a) a linear or branched alkylene group having 2 to 12 carbon atoms, b) a cyclopentamethylene group, c) a cyclohexamethylene group, d) a 5- or 6-membered azacyclic group, e) a phenylene group, f) a naphthalene group, and g) a phenylene-methylenephenylene group;

$R^H$ is a divalent hydrophobic group selected from the group consisting of a) divalent oligomeric siloxanes having the structure

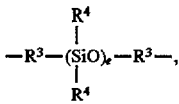

b) divalent organic groups having the structure

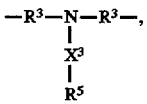

comprising a pendant alkyl group, and c) divalent organic groups having the structure

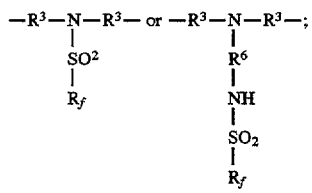

wherein $R^3$ is a divalent organic group selected from the group consisting of straight chain or branched alkylene groups having 2 to 12 carbon atoms, and arylene groups having 6 to 20 carbon atoms;

$R^4$ is a monovalent group selected from the group consisting of alkyl groups of one to about twelve carbon atoms, aralkyl groups having 6 to 10 carbon atoms, and aryl groups having 6 to 10 carbon atoms, with at least 70% of $R^4$ being methyl;

e is an integer of from about 10 to about 300;

$X^3$ is selected from the group consisting of a covalent bond, a carbonyl group, and an amide group;

$R^5$ is an alkyl group having 4 to 60 carbon atoms;

$R^6$ is an alkylene group having 2 to 12 carbon atoms;

$R_f$ is a monovalent saturated fluoroaliphatic group having at least four fully-fluorinated carbon atoms;

$R^8$ is H,

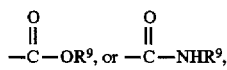

wherein $R^9$ is $-CH_2R^{10}$, $-C_2H_4R^{10}$, or $-C_3H_6R^{10}$; and $R^{10}$ is $-H$, $-OH$, or $-NH_2$.

14. The composition according to claim 13 having a release value in the range of 1.0 to 200 N/dm.

15. The polymeric composition according to claim 13 wherein M is selected from the group consisting of an alkali metal cation, an alkaline earth metal cation, and a primary, secondary, tertiary or quaternary ammonium cation.

16. The composition according to claim 7 wherein when $R^3$ is an arylene group, it is an alkarylene group having 6 to 20 carbon atoms.

17. The composition according to claim 13 wherein M is a cation selected from the group consisting of H, K, Li, Na, Mg, Ca, Ba, ammonium, methylammonium, butylammonium, diethylammonium, triethylammonium, tetraethylammonium, and benzyltrimethylammonium cation.

18. The composition according to claim 13 wherein the organic group $R^D$ comprises 1 to 10 oxycarbonyl groups.

19. The composition according to claim 13 wherein $R^2$ is substituted by one to four lower alkyl groups having 1 to 4 carbon atoms and a total of at most 15 carbon atoms.

20. The composition according to claim 13 wherein $R^3$ is an alkylarylene group having 6 to 20 carbon atoms.

21. The composition according to claim 1 having a release value in the range of 1.0 to 200 N/dm.

22. The composition according to claim 1 having ink receptive properties.

23. The composition according to claim 13 having ink receptive properties.

* * * * *